United States Patent
Stonitsch

Patent Number: 5,996,643
Date of Patent: Dec. 7, 1999

[54] FOAM INSULATION SYSTEM FOR PIPES

[76] Inventor: Lawrence J. Stonitsch, 2564 Crystal Dr., Joliet, Ill. 60435

[21] Appl. No.: 09/156,456

[22] Filed: Sep. 18, 1998

[51] Int. Cl.⁶ .................................................... F16L 9/14
[52] U.S. Cl. .......................... 138/143; 138/148; 138/113; 138/109; 138/149
[58] Field of Search .................................. 138/149, 148, 138/112–114

[56] References Cited

U.S. PATENT DOCUMENTS

| | | | |
|---|---|---|---|
| 3,126,918 | 3/1964 | Eaton | 138/113 |
| 3,213,889 | 10/1965 | Cotman, Jr. | 138/113 |
| 3,467,143 | 9/1969 | Croft | 138/113 |
| 3,677,303 | 7/1972 | Martin | 138/113 X |
| 3,932,727 | 1/1976 | True | 138/149 X |
| 4,124,040 | 11/1978 | Miller | 138/113 X |
| 4,233,816 | 11/1980 | Hensley | 138/112 X |
| 4,246,057 | 1/1981 | Janowski et al. | 138/149 X |
| 4,287,245 | 9/1981 | Kikuchi | 138/149 X |
| 4,303,105 | 12/1981 | Rohner | 138/113 X |
| 4,581,804 | 4/1986 | McLaughlin | 138/149 X |
| 5,732,742 | 3/1998 | Mentzer et al. | 138/149 X |

*Primary Examiner*—Patrick Brinson
*Attorney, Agent, or Firm*—Chapman and Cutler

[57] ABSTRACT

Pipes used for carrying hot fluids such as steam and process liquids and gases, often above 212° F., and pipes for carrying cold fluids such as for refrigeration and air conditioning systems, are usually insulated where they extend for any appreciable distance in areas of different temperatures, for reducing heat transfers. Such pipes are used in central heating and cooling distribution systems for cities, schools, universities, prisons, military bases, in industrial processing plants, and the like, whether installed above ground or underground. Polyisocyanurate and similar foamed insulation materials including polyurethane are better insulators than those now commonly used, such as foamglass, fiberglass, mineral wool, and calcium silicate; polyisocyanurate has a very low K factor and is stable at up to 400° F. for sustained temperatures and up to 450° F. peak temperatures. Foaming the polyisocyanurate about the pipe and within a thin, waterproof sleeve provides a well insulated pipe that is protected from water. Support members are applied to the thin waterproof sleeve and are spaced apart in an outer conduit to provide an air space so the pipe and sleeve can expand and contract within that conduit. This system provides a long-lived, highly efficient, insulated pipe wherein the chances of the insulation breaking down in the presence of water within the conduit or under thermal movement stresses is reduced to virtually nil. Vents and drains in the outer conduit as assembled allow for testing the integrity of the system and for purging the conduit of ground water and water vapor that may enter the conduit, as upon floods, high water tables, cooling and condensation, and the like.

6 Claims, 1 Drawing Sheet

FOAM INSULATION SYSTEM FOR PIPES

FIELD OF THE INVENTION

The present invention relates to insulated pipe systems used to convey fluids at hot and/or cold temperatures, particularly for energy distribution systems in cities, schools, prisons, military bases, industrial plants, and the like.

BACKGROUND OF THE ART

Underground piping systems for steam and hot water heating of buildings in an area such as a city, campus, or the like, from a central heating plant serving the entire area, were known in old Europe and have been used in the United States primarily in institutional settings since about 1900. More recently, since about 1947, central cooling stations too are known and used in American cities such as Chicago. Insulation has been used about the pipes in such systems, including simple enclosed air spaces in conduits and tunnels and also insulating materials such as mineral wool, fiberglass batting, and foams of polyurethane and the like. Over time, however, the insulation in many such systems has deteriorated because of moisture getting into the insulation from condensation or ground water (as from flooding) as well as from thermal movement of the pipes during heating-up and cooling-down cycles. Various inventions are directed to replacing that insulation in place, such as U.S. Pat. No. 5,732,742.

Air space or insulation is used about the central pipe and within the outer conduit in sections of pipe built for new and replacement installations of underground piping systems. For instance, among U.S. Pat. No. 4,240,850 shows assembly of a sleeve creating an air space fillable with foam insulation about an inner pipe, using circumferentially-extending, apertured spacers; U.S. Pat. No. 3,877,136 applies foam insulation to and then forms a spiral-walled tube about an inner pipe; and U.S. Pat. No. 3,709,751 covers a foam layer about a pipe with a thin plastic sleeve. Installations with multiple pipes within larger outer conduits and in tunnels are known.

High-performance polyisocyanurate and similar foams for use in this application are known from U.S. Pat. No. 4,904,703 and the '742 patent, above.

SUMMARY OF THE INVENTION

One object of the present invention is to provide factory-assembled lengths of high-performance insulated pipe for installation on-site, both for new uses in central heating and/or cooling and to replace older, now poorly-insulated assemblies.

Another object is to provide an insulated pipe system in which water and moisture can be drained and purged from the system, and wherein the insulation is protected from contact with the water and moisture and so is unaffected by same over long periods of use.

Another object is to protect the foam insulation from breakdown by the action of thermal stresses generated in changing or cycling of temperatures over time as between a central pipe, a sleeve over the insulation, and an outer conduit.

These and other objects and advantages are obtained by injecting high performance foam, such as polyisocyanurate or polyurethane foam, into a space between a pipe carrying hot or cold fluids and a covering, waterproof sleeve that is sealed to the pipe near ends of said pipe. Then the pipe and sleeve assembly is supported evenly within an outer conduit on spacers placed between the sleeve and the inner wall of the outer conduit, the spacers being spaced apart, such as every 10 feet, along the length of the pipe and constructed so as not to block transmission of air and water along the length of the outer conduit. Lengths of the pipe and outer conduit are connected together at joints. These joints and the supporting spacers allow expansion and contraction of the pipe within the outer conduit. The air space about the sleeve is openable at vents and drains provided at end plates sealing the outer conduit, for draining the space of water through the drains and for drying the space by circulating dry air through the vents and drains. Integrity of the air space can also be tested by pressurizing the space at one or more of the vents and watching for reduction of pressure. Two or more pipes each insulated in this manner and having a waterproof sleeve can be placed within a single outer conduit with appropriate modifications to the support and end plate structures.

THE PREFERRED EMBODIMENTS

Figure 1:
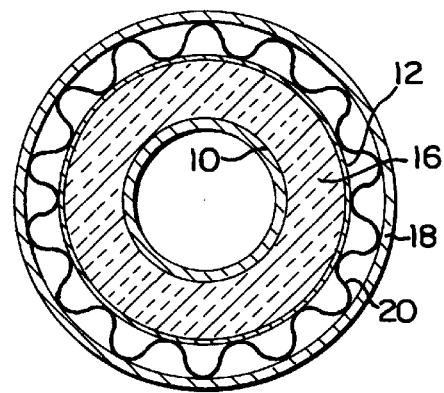
FIG. 1 is a cross-sectional view through a pipe and outer conduit of the present invention.
Figure 2:
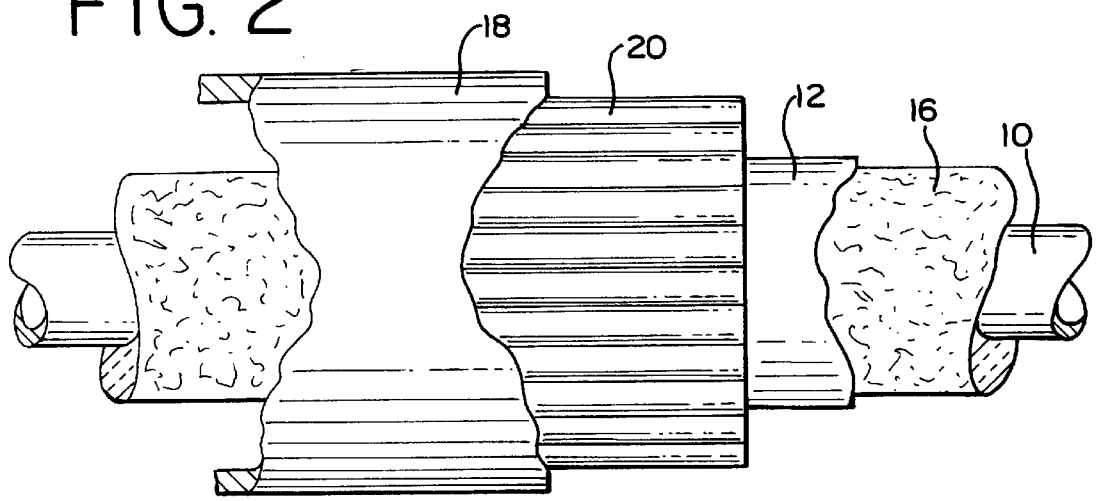
FIG. 2 is a side longitudinal view, partly broken away and partly in section, showing the layers of enclosure of the inner pipe.
Figure 3:
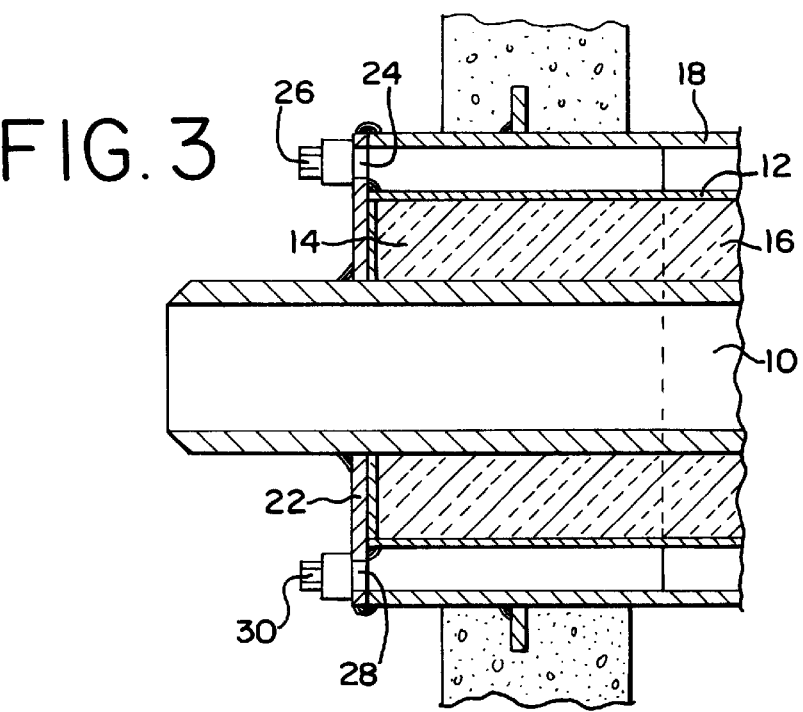
FIG. 3 is a side sectional view through the end of a section of pipe and outer conduit of the present invention.

Insulated piping according to the invention is shown in the drawings. FIGS. 1 and 2 show a carrier pipe 10 of a suitable diameter, wall thickness, and material, such as iron, steel, copper, PVC, polyethylene, fiberglass, and the like, all chosen in view of the material, volume flow, pressures, and temperatures to be used in the system during its life. The carrier pipe 10 is surrounded along most of its length by a thin waterproof sleeve 12. This sleeve 12 is comprised of steel (carbon, stainless, or other), aluminum, PVC, or other material, of an inner diameter sufficient to provide a suitable insulation space between the sleeve and the outside of the pipe 10. Ends of the sleeve 12 stop several inches short of the ends of the carrier pipe 10, as shown in FIG. 3, and are there sealed to the outside surface of the pipe 10 by any means known in the art for the particular installation, including temperatures, pipe and sleeve materials, etc. A simple annular piece 14 is shown as press-fit into the space, but other joints can be used such as ones secured or protected by adhesive sleeves, by seals and slip-joints of O-rings, and the like. The need is to allow for the different expansions of the pipe 10 and sleeve 12 under the differing temperatures that the components are expected to encounter during periods of use and non-use, as is known in the art. Such expansions and contractions will depend on the material being carried in the pipe 10, its pressure and temperature, the nature and characteristics of insulation 16 used in the intervening space, whether a second pipe with different material is within the same surrounding outer conduit 18, and the natures and temperature of the surroundings including the material of outer conduit 18 and the earth or other space (not shown) outside that outer conduit.

The insulation 16 used to fill the space between the carrier pipe 10 and the sleeve 12, from one end seal 14 to the other, is advantageously a polyisocyanurate foam such as is known from U.S. Pat. No. 4,904,703. This and similar foam type insulations such as polyurethane and urethane-modified polyisocyanurate can be applied in any known manner, such as is disclosed in U.S. Pat. No. 5,732,742, between the pipe 10 and the sleeve 12, or by other suitable methods and devices as are known or hereafter developed in the art. The foam insulation 16 should be applied uniformly and completely to the space between the carrier pipe 10 and the sleeve 12, such as by fitting the end seals 14 only after filling the sface from the center of the length of the pipe and working outwardly to both ends, while holding the pipe concentrically in the sleeve 12 until the foam cures and hardens. When properly used, polyisocyanurate foam has an excellent heat transmission- or K-factor of 0.14 at 73° F., as compared to those of other commonly used insulating materials, such as fiberglass at 0.28, mineral wool at 0.31, calcium silicate at 0.32, and foamglass at 0.41, corresponding to insulating- or R-values of 7, 3.6, 3.2, 3.1, and 2.4 per inch thickness of material, respectively. Protecting the foam from exposure to water as in the present invention can preserve its insulation value, contrary to the approach of the '742 patent (which leaves the foam exposed to ground water at the injection holes and/or at other holes and breaks in the outer conduit).

Once the foam 16 has set and hardened between the pipe 10 and the sleeve 12, the end caps 14 are put into place between the pipe 10 and the sleeve 12. Then that assembly is fitted with spacers 20 within the outer conduit 18. Spacers 20 are shown as corrugated bands, but they may be of any form which provides distributed loading of the weight of the assembly 10, 12, and 16 and the weight and forces of the flowing fluid within the pipe 10 upon the outer conduit 18. The spacers 20 should be of the same material as the sleeve 12 and/or the outer conduit 18, or of a compatible material, so as to reduce or avoid galvanic action in the event of wetness within the outer conduit 18. The spacers 20 must be open or perforated to some degree in part to allow water and air to flow through the space about the sleeve 12 and along the outer conduit 18, at least at the bottom and preferably also at the top in the orientation in which the assembly is installed for use. Of course, where multiple openings are provided about the circumference of the spacer, as is shown using a corrugated member, the orientation of the pipe as installed is irrelevant. Each spacer may extend about four to 12 inches in length along the pipe, spaced at about 10 feet on center, but the length of each spacer and their spacing may be less or more depending on the weights involved in the assembly to be supported inside the outer conduit.

The lengths of pipe and outer conduit can be connected end to end, and at T-s and Y-s and otherwise, as is known in the art. Joints are assembled and insulated as is shown for instance in the inventor's prior U.S. Pat. Nos. 4,484,386 and 4,221,405, modified for the present invention to limit the insulation to what would fit within the cross-section of the sleeve 12.

At each end of an entire run of insulated pipe as assembled in a use location, an end plate 22 is welded or otherwise fastened to the end of the outer conduit 18 and about the carrier pipe 10. The end plate can also be welded or fastened to the sleeve 12, as shown in FIG. 3, prior to fastening the end plate to the outer conduit 18. A vent hole 24 is provided near the gravitational top of the end plate 22 and fitted with an openable and resealable threaded plug 26. A drain hole 28 is similarly provided in the end plate near the gravitational bottom of the end plate 22 and fitted with an openable and resealable plug 30.

For periodic maintenance, the drain plug 30 at the lower end of the pipe run is removed and the outer conduit is checked for water and other fluids, as from ground water entering any break in the outer conduit 18 and at any joint, or from the fluid transported in the carrier pipe 10 and passing through insulation 16 and sleeve 12. If water or other fluid is present, the system is completely drained (opening the vent 26, 24 helps) and then the carrier pipe and the outer conduit systems are pressure tested to confirm and then to find the location of the leak, and the leak is stopped and repaired. Then the space can be dried dry pumping dry air through the vent 26, 24 at one end of the pipe run and flowing it out through the vent 26, 24 and/or the drain 28, 30 at the other end.

Many variations may be made in the assembly and construction shown and its manner of use without departing from the principles of the invention as pictured and described herein and claimed as our invention. For instance, the polyisocyanurate foam may be replaced with polyurethane foam with only some loss of efficiency and reduction in temperature capability, to less than about 240° F. Two or more pipes may be used in a single outer conduit, each with insulation and a sleeve and both mounted together in suitable supports and spacers and with suitable end plates in an outer conduit. The invention resides broadly in the arrangements of the pipe, sleeve, insulation, spacers, and outer conduit as disclosed and recited in the claims. Minor variations will not avoid the use of the invention.

I claim as my invention:

1. An insulated piping system comprising:
   an inner pipe for carrying a fluid along a length of said pipe;
   a waterproof sleeve about and spaced radially outwardly of said pipe along said length;
   insulation substantially completely filling the annular space between the pipe and the sleeve along said length;
   an outer conduit about and spaced outwardly of said sleeve and along said length; and
   support and spacing members spaced apart along the sleeve and extending about the sleeve in the space between the sleeve and the outer conduit,
   wherein the fluid is hot and the insulation withstands continuous working temperatures from minus 320 degrees Fahrenheit up to about 400 degrees Fahrenheit and further withstands peak temperatures of the fluid of over 400 degrees Fahrenheit and up to 450 degrees Fahrenheit,
   whereby to reduce heat transfer between the fluid and the environment outside the outer conduit over extended periods of time by avoiding water damage to the insulation and to reduce mechanical stresses on the insulation as the pipe, sleeve, and outer conduit change temperatures during use.

2. The piping system defined in claim 1, wherein the insulation comprises polyisocyanurate foam.

3. The piping system defined in claim 1, wherein the insulation comprises polyurethane foam.

4. The piping system defined in claim 1, further comprising an end plate closing the end of the outer conduit and passing the pipe through it, and a vent and a drain formed in the end plate and spaced gravitationally vertically apart from one another and communicating into the space between the outer conduit and the sleeve and about and through the spacing and support members.

5. The piping system defined in claim 4, wherein each of the vent and the drain are selectively openable and closeable for selective passage of air, fluid, and vapor.

6. A pre-insulated piping system for assembly in the field, the system comprising a series of at least two insulated pipe sections and at least one end member adjacent a terminal end of the assembly, wherein each said section comprises:

a pipe having a length for carrying a fluid from one end thereof to an opposite end;

a sleeve surrounding and spaced radially from the pipe all along its length except at the two ends thereof;

insulation between the pipe and the sleeve, wherein the insulation is comprised of one of polyisocyanurate foam and polyurethane foam;

an outer conduit enclosing the pipe, sleeve, and insulation and spaced radially from the sleeve and the pipe by an air space; and spacing members interposed between the sleeve and the outer conduit and spaced apart along same to maintain said air space; and wherein each end member comprises:

a generally annular end plate closing off the air space between the pipe and the outer conduit; and a vent and a drain formed in said end plate to selectively communicate into and from said air space.

* * * * *